United States Patent [19]

Salman et al.

[11] Patent Number: 5,097,557
[45] Date of Patent: Mar. 24, 1992

[54] TRAPEZOIDAL BEAM DOCK LEVELER

[75] Inventors: David E. Salman; James C. Alexander, both of London, Canada

[73] Assignee: The Serco Corporation, Canada

[21] Appl. No.: 593,402

[22] Filed: Oct. 5, 1990

[51] Int. Cl.⁵ .............................................. E01D 1/00
[52] U.S. Cl. .......................................... 14/71.1; 14/71.3
[58] Field of Search ................. 52/371, 372, 630, 723; 14/71.1, 71.3

[56] References Cited

U.S. PATENT DOCUMENTS

| Re. 30,104 | 10/1979 | Burnham | 14/71.3 |
|---|---|---|---|
| 758,728 | 5/1904 | Wight et al. | 52/723 X |
| 1,078,365 | 11/1913 | Luten | 52/723 |
| 1,089,487 | 3/1914 | Luten | 52/732 |
| 1,627,000 | 5/1927 | Yeager | 52/723 X |
| 1,990,156 | 12/1932 | Young | 52/723 X |
| 2,033,751 | 3/1936 | Yeager | 52/731 |
| 2,271,079 | 1/1942 | Kieser | 52/723 X |
| 2,356,309 | 5/1941 | Garbe | 52/731 |
| 2,448,109 | 8/1948 | Michael | 52/731 |
| 2,746,789 | 5/1956 | Ridway | 52/630 |
| 3,995,081 | 11/1976 | Fant et al. | 52/630 |
| 4,115,971 | 9/1978 | Varga | 52/723 X |
| 4,557,008 | 12/1985 | Jurden | 14/71.1 |
| 4,566,240 | 1/1986 | Schilger | 52/723 X |
| 4,811,540 | 3/1989 | Kallies et al. | 52/630 |
| 4,922,568 | 5/1990 | Hageman | 14/71.1 |

Primary Examiner—Ramon S. Britts
Assistant Examiner—Nancy P. Connolly
Attorney, Agent, or Firm—Sughrue, Mion, Zinn, Macpeak & Seas

[57] ABSTRACT

A dock leveler having a rigid flat deck and a hinge pin coupling the leveler to a loading dock. The deck is supported by a series of spaced box beams forming a trapezoidal cross-section with the underside of the deck.

9 Claims, 2 Drawing Sheets

TRAPEZOIDAL BEAM DOCK LEVELER

BACKGROUND OF THE INVENTION

This invention relates to dock leveler construction and in particular to an improved support system in the form of trapezoidal shaped beams which support the deck plate of the leveler.

Dock levelers are used in the material handling industry at loading docks to provide a bridge between a dock and the bed of a vehicle which is loaded and/or unloaded. These devices are either pit or box mounted and may store either vertically or horizontally. Actuation of the dock leveler is by use of hydraulics or mechanical spring systems.

During loading and unloading operations there is a difference in the level between the dock leveler deck and the bed of a truck. Thus, some technique must be used to compensate for the difference in level. Systems in use employ either a flexible deck with rear hinges or a rigid deck with floating rear hinges. In the case of a flexible deck, beams are used which must have a low torsion rigidity. Examples are the C-channel, the I-beam, or in some cases special beam arrangements such as T or Lambda beams. The T beam construction is illustrated in the context of the leveler in U.S. Pat. No. 3,587,126. The so called lambda beam is illustrated in a leveler in U.S. Pat. No. 4,086,338.

A leveler employing a rigid deck construction is generally strengthened by having the deck plate welded to a box beam to provide a complete composite beam structure. In practice, the box beam is formed using a channel which forms a complete box when the two free legs are welded to the deck plate. Structural analysis has demonstrated that a box beam provides the most efficient structure for a dock leveler deck assembly.

The box beam when compared to all other beam sections with the exception of a L or T beam has a higher proportion of material at the maximum distance below the deck plate. This provides a stiffer composite beam structure for a given weight of steel.

Each box beam flange provides two support ribs for the deck as compared to a single support area for a Channel, I beam, L or T beam. This in turn reduces the span of deck plate between the beams and provides the deck plate with better strength and stiffness to resist highly concentrated loads such as those exerted by a fork lift truck traversing the deck plate. The bending stress caused by the load on the plate between the beams is proportional to the square of the span between adjacent beams. The deflection is proportional to the cube of the span. Also, the box beam is easier to assemble because it is inherently stable when set in place during assembly. A Channel section is marginally stable but an L or T section is unstable and must be held in place or it may fall over.

U.S. Pat. No. 4,928,340 defines an improvement in box beam technology by providing split box beams to insure torsional flexibility in dock leveler systems that employ rigid hinge pin construction. This technique is effective to solve the problems with rigid pin systems. It however provided no more support than a conventional box beam to the deck.

SUMMARY OF THE INVENTION

Given the deficiencies in beam reinforcement construction of prior art levelers, it is an object of this invention to provide a dock leveler system which provides for a structural improvement in deck reinforcement without significantly increasing the amount of material required.

Yet another object of this invention is to provide for an improved dock leveler system which may be used with either horizontally or vertically storing dock levelers yet provides all the advantages of box beam construction with the necessary strength for released weight of reinforcement.

These and other objects of this invention are accomplished by means of a dock leveler deck assembly which employs trapezoidal beams. By use of a trapezoidal construction, a significant increase in width across the flanges occurs with only a very slight increase in the amount of material which is required. Fabrication costs remain essentially the same as utilizing conventional box beams.

This invention will be described in greater detail by referring to the attached drawing and the description of the preferred embodiment that follows.

DESCRIPTION OF THE PREFERRED EMBODIMENT

Figure 1:
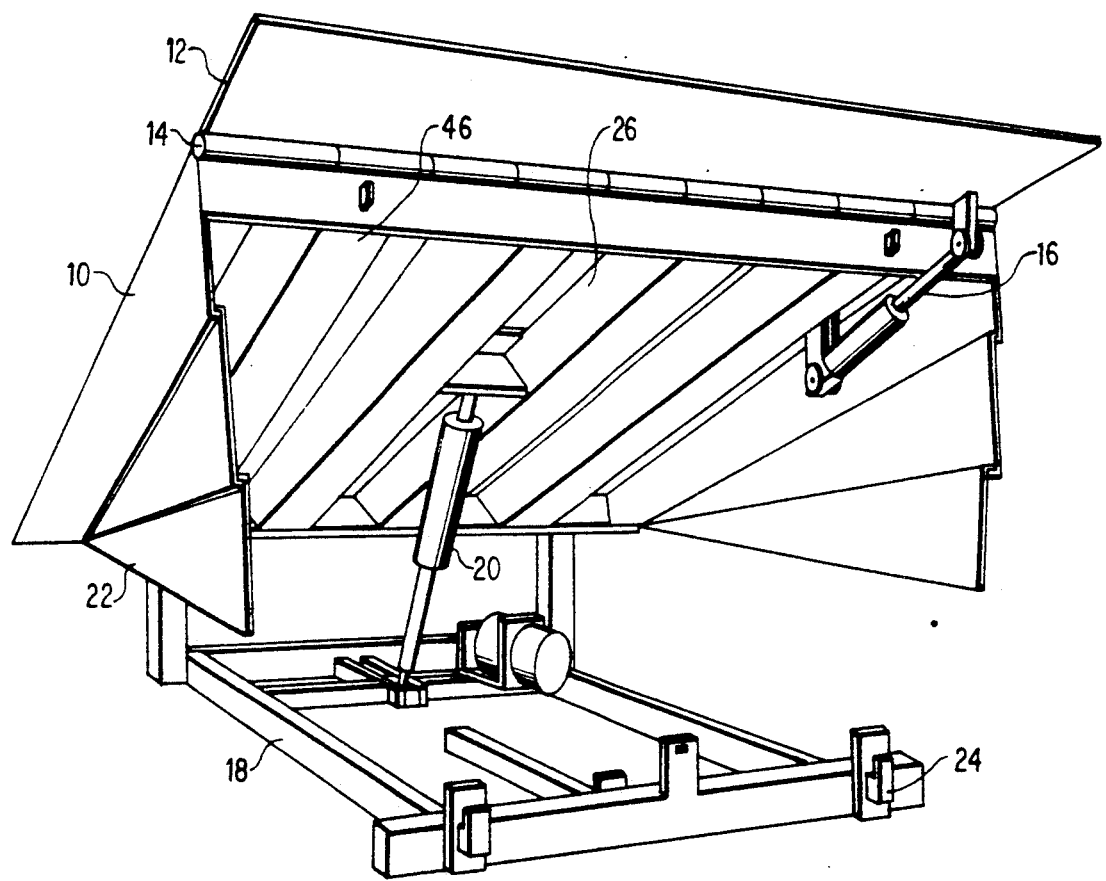
FIG. 1 is a perspective view of a dock leveler utilizing the construction of this invention.

Referring now to FIG. 1, the basic elements of a dock leveler employing the trapezoidal beam construction of this invention is depicted. It will be appreciated by those working in this technology that while the dock leveler as illustrated is an hydraulic pit style leveler, this invention may be used with any mechanically actuated dock leveler whether it be pit or box mounted or stored horizontally or vertically. That is, this invention is not limited to any particular type of dock leveler structure.

For purposes of illustration, the leveler of FIG. 1 comprises a deck 10 having hingedly mounted thereto an extendable lip 12. The lip 12 is mounted to the deck 10 by means of a hinge 14 and is actuated by means of an hydraulic cylinder 16. It will be appreciated that other modes of actuation are within the scope of this invention. Various mechanical and spring loaded arrangements may be used.

Lip actuation utilizing the hydraulic cylinder 16 is accomplished by actuating a control panel, not illustrated. The leveler is mounted as a self supported unit in a pit, that is, a recess in the dock by means of a frame structure 18. In the case of a pit type mount, the deck 10 is pivotally mounted to the dock face by means of a fixed rear hinge, not illustrated. In the case of a box style unit, the leveler would be pivotally mounted to its own box type housing. As illustrated in FIG. 1, the leveler is raised up and down by means of an hydraulic cylinder 20. The cylinder 20 is also actuated from a control panel, not illustrated. The leveler further comprises a fan-like series of toe guards 22 and lip keepers 24. When the lip 12 is in a pendant position the lip keepers 24 serve to support the deck 10 level with the dock floor.

As illustrated in FIG. 1, the deck 10 is supported by means of 4 trapezoidal box beams 26. As explained herein, each of those beams provides sufficient beam strength in the longitudinal direction to withstand the bending stresses caused by loads being transported across the structure. Additionally, the beams permit the deck plate to resist lateral deformation caused by concentrated loads between the supporting beams by minimizing the distance therebetween.

Figure 2:
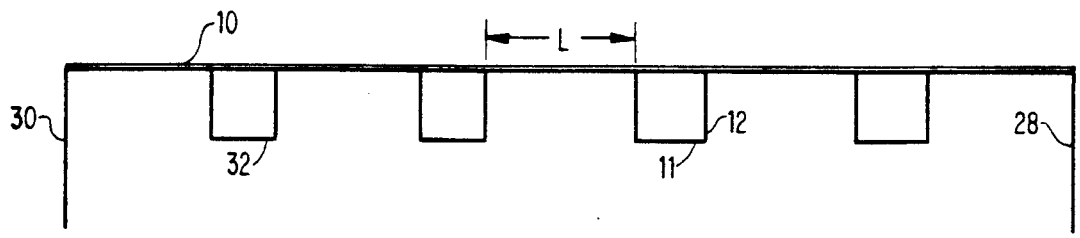
FIG. 2 is a cross section of a prior art box beam deck assembly.

FIG. 2 illustrates the prior art arrangement employing typical box beam assembly. In FIG. 2 the deck 10 has a pair of side panels 28, 30 welded to it. The box beams are typically U-section 32 welded longitudinally to the underside of the deck 10. The lateral spacing of the beams (L) is a function of the overall width of the deck 10 and the load to be supported. In FIG. 2, the number of beams required to resist the bending loads are less than the number required to provide equal spacing on the deck plate. The spans of deck between the beams (L) is significantly greater than the width of the beams.

Figure 3:
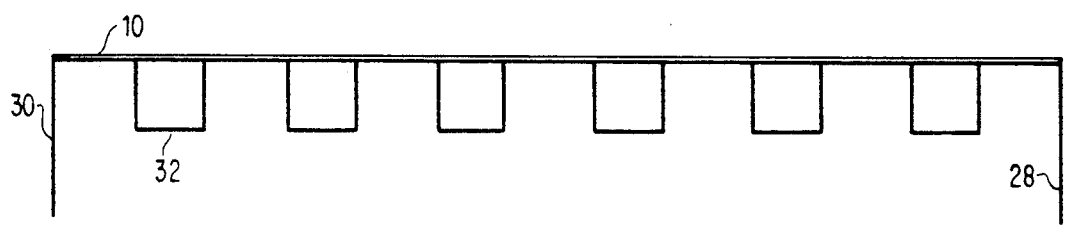
FIGS. 3 and 4 illustrate alternative box beam constructions.
Figure 4:
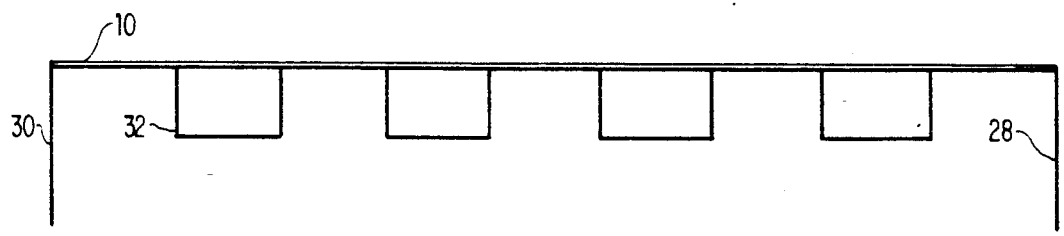

When a heavy concentrated load as supplied between the beams the strength of the deck plate alone may be inadequate. Thus, it is desirable to reduce the unsupported span. One solution is illustrated in FIG. 3 by increasing the number of beams 32. While increasing the number of beams decreases the span between the beams, it in turn increases the weight and cost of the structure. FIG. 4 illustrates another alternative by increasing the width of the beams to minimize the length of span, but this increases the amount of material used.

Figure 5:
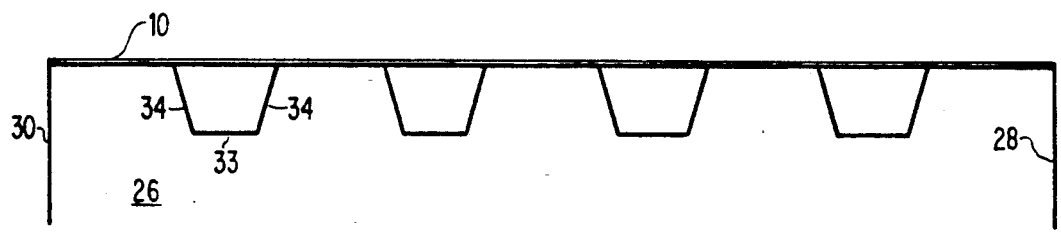
FIG. 5 is a cross sectional view of a trapezoidal beam back reinforcement in accordance with this invention.

The trapezoidal beam illustrated in FIG. 5 has flanges of the channels spread to achieve the same structural improvement as would be possible in FIG. 4. As illustrated in FIG. 5 each of the trapezoidal beams 26 has a base 33 and a pair of sides 34. The sides 34 diverge from the base 33 with the sides 33 mounted to the underside of the deck. The area enclosed, as illustrated in FIG. 5 is a trapezoid. That is, the weld points of attachment to the deck 10 are in the same position as they would be if wider rectangular box beams were employed, however, there is no significant increase in material since the channel section retains nearly the same flange length as the basic rectangular box beam illustrated in FIG. 2. When compared to the beams of FIG. 2, the trapezoidal beam achieves a 50% increase in width across the flanges with only a 2% increase in the material required.

It will be appreciated that modifications of this invention may be practiced without departing from the essential scope thereof. For example, while four beams are shown positioned parallel to each other, the number of beams may be varied as is their spacing depending on the size and use of the leveler.

Having described our invention, we claim:

1. A dock leveler comprising:
   a platform,
   hinge means coupling said platform to a stationary member,
   means to move said platform from one position to another position, and
   a series of spaced box beams mounted to said platform to provide support for said platform, each of said box beams having a base member substantially parallel to said platform, a pair of side members mounted to said base member and diverging outward from each other, said side members mounted to an underside of said platform to form with said underside a trapezoidal cross-section shaped box beam.

2. The dock leveler of claim 1, wherein each of said box beams comprise an integral section having sides diverging from said base member.

3. The dock leveler of claim 1, wherein said box beams are mounted to said platform parallel to each other.

4. The dock leveler of claim 1, wherein said box beams are mounted to said platform parallel to each other and spaced uniformly apart.

5. The dock leveler of claim 1, wherein said means to move said platform comprises an hydraulic cylinder.

6. The dock leveler of claim 1 further comprising a lip mounted on one end of said platform and means to extend said lip when said leveler is lowered into an operative position.

7. A dock leveler comprising:
   a movable platform.
   hinge means coupling said platform to a stationary member, means to move said platform relative to said stationary member from an inoperative position to an operative position;
   a series of spaced box beams mounted to said platform to provide support for said platform, each of said box beams having a base member parallel to said platform and a pair of side members mounted to said base member and diverging from each other outward from said base member, each of said side members mounted to an underside of said platform to form with said underside a trapezoidal cross-section shaped box beam.

8. The dock leveler of claim 7, wherein said beams are positioned on said platform parallel to each other.

9. The dock leveler of claim 7, wherein said beams mounted to said platform parallel to each other and uniformly spaced apart.

* * * * *